UNITED STATES PATENT OFFICE.

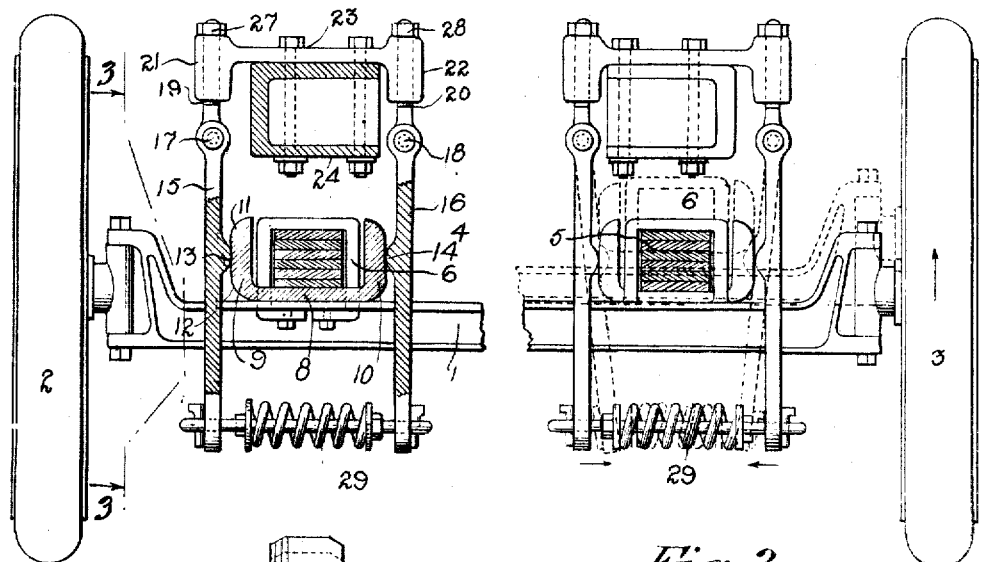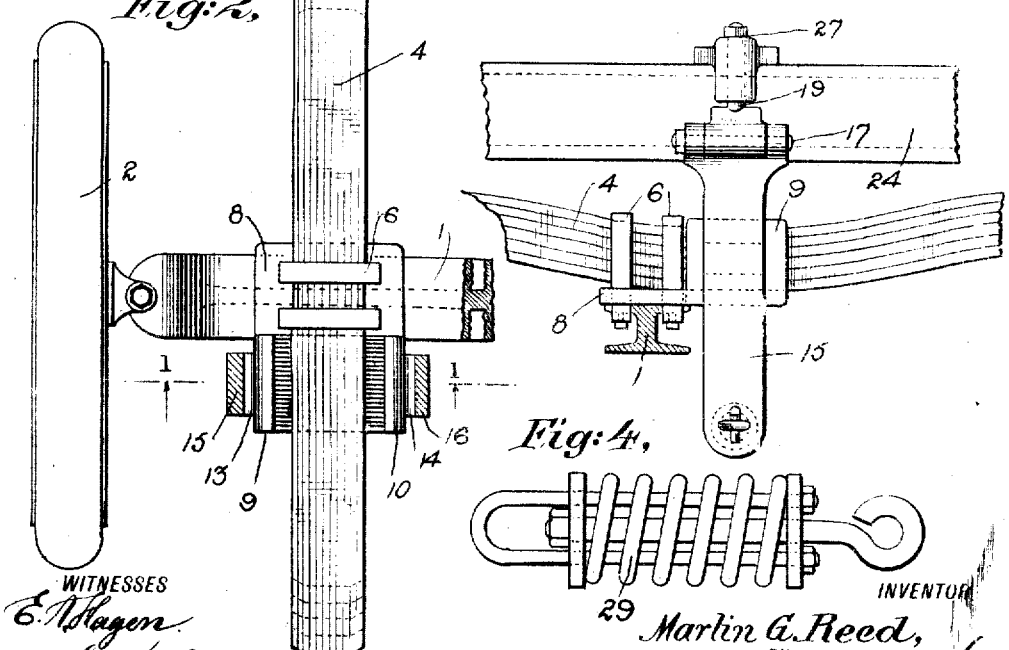

MARLIN GRAVES REED, OF BROOKVILLE, PENNSYLVANIA.

SHOCK-ABSORBER.

1,356,471.   Specification of Letters Patent.   Patented Oct. 19, 1920.

Application filed June 11, 1919. Serial No. 303,276.

*To all whom it may concern:*

Be it known that I, MARLIN G. REED, a citizen of the United States, and a resident of Brookville, in the county of Jefferson and State of Pennsylvania, have invented a new and Improved Shock-Absorber, of which the following is a full, clear, and exact description.

This invention relates to shock absorbers, and has for an object the provision of an improved construction wherein means are provided which will not prevent a free up or down initial movement of the wheel or axle, but will yieldingly resist a return movement.

Another object of the invention is to provide a shock absorber in which friction members are provided for resisting somewhat movement in either direction of an axle and providing a greatly increased resistance to the return of an axle from either an up or down position.

A still further object of the invention is to provide a shock absorber having a pair of spring pressed pivotally mounted members arranged to produce friction when the axle moves up or down independent of the body of the vehicle to which the device is connected and to increase this resistance when the movement is appreciable.

In the accompanying drawing:

Figure 1 is a vertical sectional view through part of an automobile showing the arrangement of shock absorbers therefor.

Fig. 2 is a fragmentary sectional view through Fig. 1 on line 2—2.

Fig. 3 is a section through Fig. 1 on line 3—3.

Fig. 4 is an enlarged top plan view of the spring structure forming certain features of the invention.

Referring to the accompanying drawing by numerals, 1 indicates an axle of an automobile to which is connected the wheels 2 and 3. This axle carries springs 4 and 5 of any desired kind, as for instance the ordinary leaf spring structure, which are held in place by suitable U-bolts 6 and 7. As one set of springs and parts associated therewith are identical with the other the description of one will equally apply to both. As shown in Fig. 1 the friction plate 8 is formed with upstanding walls 9 and 10, said plate being held in place by the U-bolt 6 as shown in Fig. 3. These friction plates are mounted at the top and bottom so as to present substantially cam surfaces 11 and 12 against which the cams 13 and 14 press under some circumstances, but normally the cams 13 and 14 press against the center of the side walls 9 and 10. These cams are rigidly secured to or formed integral with the bars 15 and 16, which bars are pivotally mounted at 17 and 18 on the rods 19 and 20, which rods extend through suitable guiding enlargements 21 and 22 preferably formed integral with the plate 23 which is bolted or otherwise rigidly secured to the beam 24 forming part of the car body. The rods 19 and 20 are threaded for the full length for providing an adjustment of bars 15 and 16, nuts 27 and 28 acting as jam or lock nuts. The bars 15 and 16 project an appreciable distance below the plate 8 and at the lower end carry a spring structure 29, which is formed as shown more particularly in Fig. 4. This arrangement of spring structure is old, but is used at the lower part of the bars 15 and 16 so as to draw these bars together as shown in dotted lines at the right in Fig. 1. Whenever the plate 8 moves upward a predetermined distance, or downward a predetermined distance, as shown at the right in Fig. 1, the axles and associated parts are moved upwardly until the cam 13 is moved under the cam surface 12. This will prevent any rebound while allowing a slow return to normal position with the cam 13 substantially central of the wall 9.

In operation the parts are normally in the position shown in Fig. 1 with the cams 13 and 14 positioned centrally of the walls 9 and 10. If the axle 1 should move upwardly as shown in dotted lines in Fig. 1 the axle would be as just described. In case the axle should drop down the walls 9 and 10 would then move beneath the cams 13 and 14. The return of the cams to their correct position is resisted by the spring structure 29, the action of which may be varied by adjusting the various nuts on the draw bar of the structure or the U-member.

What I claim is:

1. A shock absorber for automobiles comprising a plate formed with a pair of upstanding walls adapted to straddle one of the springs of an automobile, said plate having openings through which the U-bolts for clamping said spring in position pass and also clamp the plate in position, a pair of bars arranged substantially parallel with said upstanding walls, each of said bars having a rounded cam normally engaging an outer surface of said upstanding walls, means for pivotally connecting the upper ends of said bars to the body of an automobile, and a spring connected with the lower ends of said bars for pulling the same toward each other whereby there will be appreciable friction against said upstanding walls and an appreciable retarding effect when said cams are moved above or below said walls by reason of the action of said spring and the action of said cams.

2. A shock absorber for automobiles comprising a pair of spaced friction members round at the top and bottom, a pair of cams acting on the friction members adapted to slide over portions of said friction members including the tops and bottoms thereof, and a spring construction for causing the cams to continually press against the friction members whereby there will be a continuous resistance to the movement of the cams as they move over the friction member and an increased resistance to movement of the cams from a position above or below the friction members.

3. A shock absorber for automobiles comprising a plate formed with a pair of upstanding walls, a pair of bars arranged substantially parallel to said upstanding walls, each of said bars having a rounded cam normally engaging an outer surface of said upstanding walls, means for pivotally connecting the upper ends of said bars to the body of an automobile, and a spring connected with the lower ends of said bars for pulling the same toward each other whereby there will be appreciable friction against said upstanding walls and an appreciable retarding effect when said cams are moved from positions above or below said walls by reason of the action of said springs and the action of said cams.

MARLIN GRAVES REED.